(12) United States Patent
Makram-Ebeid

(10) Patent No.: US 7,873,195 B2
(45) Date of Patent: Jan. 18, 2011

(54) CONFORMAL SEGMENTATION OF ORGANS IN MEDICAL IMAGES

(75) Inventor: Sherif Makram-Ebeid, Dampierre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 971 days.

(21) Appl. No.: 11/575,701

(22) PCT Filed: Sep. 20, 2005

(86) PCT No.: PCT/IB2005/053094
§ 371 (c)(1),
(2), (4) Date: Mar. 21, 2007

(87) PCT Pub. No.: WO2006/033077
PCT Pub. Date: Mar. 30, 2006

(65) Prior Publication Data
US 2008/0137953 A1    Jun. 12, 2008

(30) Foreign Application Priority Data
Sep. 22, 2004   (EP)   .................... 04300617

(51) Int. Cl.
G06K 9/00    (2006.01)
G06K 9/34    (2006.01)
(52) U.S. Cl. ........................ 382/128; 382/173
(58) Field of Classification Search ............ 382/128, 382/164, 171, 173–180
See application file for complete search history.

(56) References Cited

U.S. PATENT DOCUMENTS

| | | | |
|---|---|---|---|
| 5,830,141 A * | 11/1998 | Makram-Ebeid et al. | .... 600/407 |
| 5,848,198 A | 12/1998 | Penn | |
| 6,047,090 A | 4/2000 | Makram-Ebeid | |
| 6,134,353 A * | 10/2000 | Makram-Ebeid | ............ 382/259 |
| 6,249,594 B1 | 6/2001 | Hibbard | |

(Continued)

FOREIGN PATENT DOCUMENTS

TW    554629    9/2003

(Continued)

OTHER PUBLICATIONS

Ibrahim Akduman and Rainer Kress, "Electrostatic imaging via conformal mapping", 2002 Inverse Problems, vol. 18, 1659-1672.*

(Continued)

Primary Examiner—Samir A. Ahmed
Assistant Examiner—Li Liu
(74) Attorney, Agent, or Firm—Yan Glickberg

(57) ABSTRACT

A method and an apparatus for segmenting contours of objects in an image is disclosed. It particularly applies to the segmentation of body organs or parts depicted in medical images. An input image containing at least one object comprises pixel data sets of at least two dimensions. An edge-detected image is obtained from the input image. Markers are selected in the edge-detected image, and assigned respective fixed electrical potential values. An electrical potential map is generated as a solution to an electrostatic problem in a resistive medium having a resistivity dependent on the edge-detected image, with the markers defining electrodes at the respective fixed potential values. Object contours are estimated, for example by thresholding, from the generated potential map.

15 Claims, 4 Drawing Sheets

U.S. PATENT DOCUMENTS

Figure 1A:
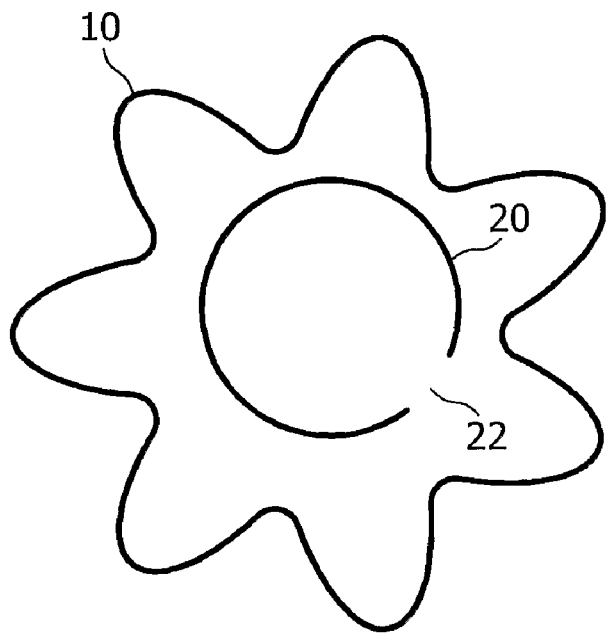

| | | | |
|---|---|---|---|
| 6,332,034 B1 * | 12/2001 | Makram-Ebeid et al. | 382/128 |
| 2003/0068074 A1 | 4/2003 | Hahn | |
| 2004/0170320 A1 | 9/2004 | Gerard | |
| 2005/0163375 A1 * | 7/2005 | Grady | 382/180 |

FOREIGN PATENT DOCUMENTS

| | | |
|---|---|---|
| WO | 03052696 A2 | 6/2003 |

OTHER PUBLICATIONS

W R B Lionheart, "Conformal uniqueness results in anisotropic electrical impedance imaging". 1997 Inverse Problems, 13, 125-134.*

Meyer F et al "Multiscale Morphological Segmentations based on watershed flooding and eikonal PDE" 1999, pp. 351-362.

Deschamps T. et al "Fast Evolution of Image Manifolds and Application to Filtering and Segmentation in 3D Medical Images", IEEE Transactions on Visualization and Computer Graphics Sep. 2004, pp. 1077-2626.

Dang T. et al "An Image Segmentation Technique based on Edge-Preserving Smoothing Filter and Anisotropic Diffusion" 1994, pp. 65-69.

Barrett W.A. et al "Intelligent Segmentation Tools" Biomedical Imaging 2002, pp. 217-220.

Suri J.S. "Two-Dimensional Fast Magnetic Resonance Brain Segmentation" Ieee Engineering in Medicine and Biology Magazine, Jul. 2001, pp. 84-95.

* cited by examiner

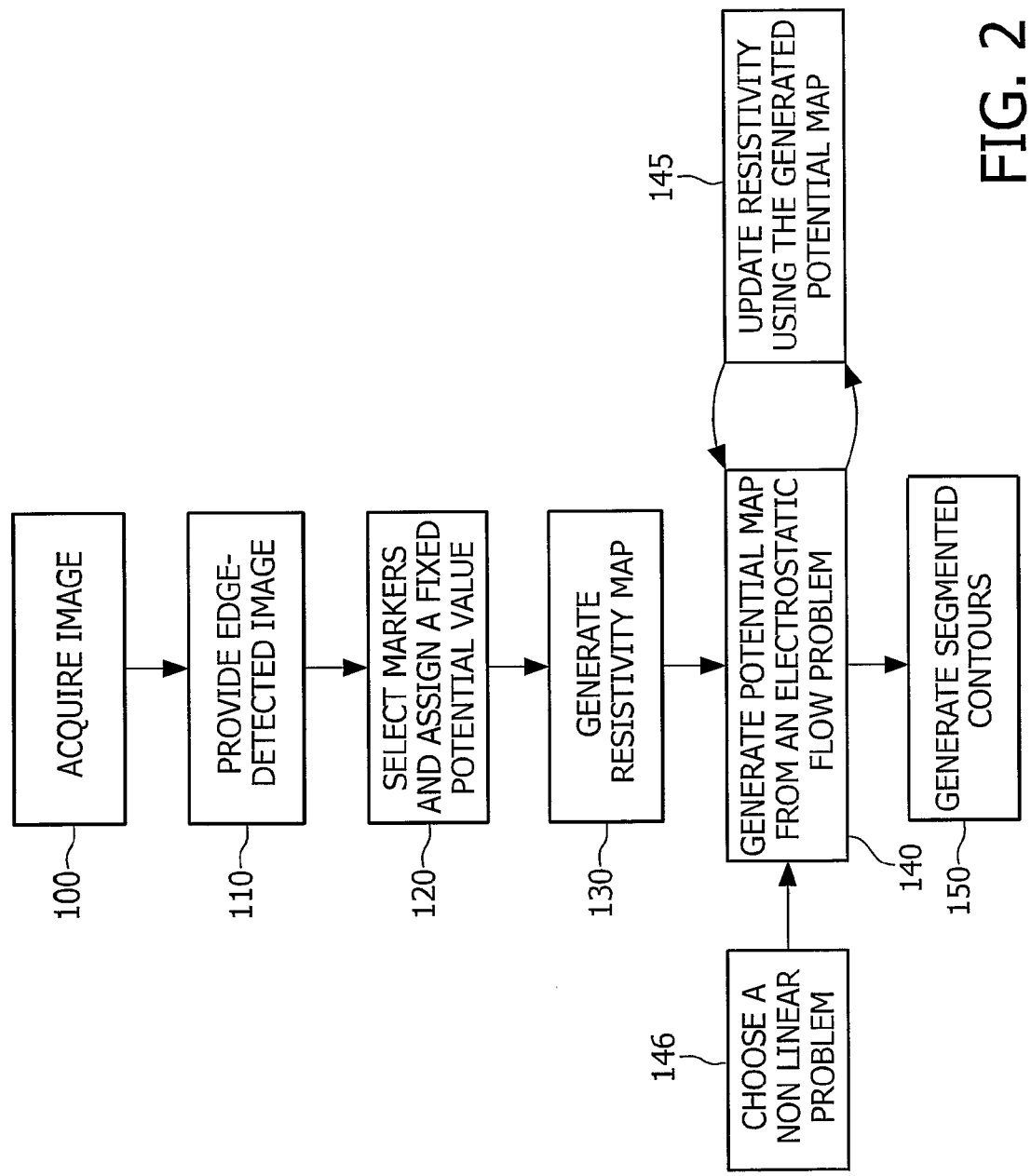

CONFORMAL SEGMENTATION OF ORGANS IN MEDICAL IMAGES

The present invention relates to image segmentation. More specifically, the present invention addresses a robust procedure for segmenting a large class of boundaries of distinct and discrete objects depicted in digital images, particularly medical images.

Such a segmentation technique processes a digital image to detect, classify, and enumerate discrete objects depicted therein. It comprises the determination of contours for objects within a region of interest (ROI), i.e. their outline or boundary, which is useful for the identification and localization of objects and the analysis of their shape, form, size, motion, etc.

Segmentation is one of the most challenging tasks in image processing, as it requires to some extent a semantic understanding of the image. It also represents a difficult problem because digital images generally lack sufficient information to constrain the possible solutions of the segmentation problem to a small set of solutions that includes the correct solution.

Image segmentation finds a popular application in the field of medical images, particularly computed tomography (CT) images, x-ray images, ultrasound (US) images, magnetic resonance (MR) images, and the like. It is highly desirable to locate various anatomic objects (such as the heart chambers, prostate, kidneys, the liver, the pancreas, etc.) that are visible in such medical images. The location of an anatomic object relative to its surroundings can be used to plan and execute medical procedures such as surgery, radiotherapy treatment for cancer, etc.

Image segmentation operates on medical images in their digital form. A digital image of a target such as a part of the human body is a data set comprising an array of data elements, each data element having a numerical data value corresponding to a property of the target. The property can be measured by an image sensor at regular intervals throughout the image sensor's field of view. It can also be computed according to a pixel grid based on projection data. The property to which the data values correspond may be the light intensity of black and white photography, the separate RGB components of a color image, the X-ray attenuation coefficient, the hydrogen content for MR, etc.

Among known segmentation techniques, the watershed transform provides a convenient and powerful tool, both for interactive and automatic segmentation. This classical "morphological segmentation" can be view as flooding the gradient image seen as a topographic surface. First, a gradient image is constructed. Secondly, for each object of interest, an inside marker is automatically or interactively defined. Finally, the watershed associated to the markers is built, flooding progressively (introducing a time parameter) the topographic surface. The result, independent of the shape or the placement of the markers in the zones of interest, is obtained by a global minimization implying both the topography of the surface and the complete set of markers.

In "Multiscale Morphological Segmentation based on Watershed, Flooding and Eikonal PDE", by F. Meyer and P. Maragos, Scale-Space '99, LNCS 1682, pp. 351-362, a variation of the watershed transform is proposed based on an efficient method for finding the solution of a Partial Differential Equation (PDE) known as the Eikonal Equation. It allows the computation of an adaptive ultrametric distance defined so that points separated by an edge are considered further apart than points that are not separated by an edge.

When using such techniques for medical organ segmentation, limitations are encountered when parts of the object boundaries have a weak contrast. The shortcomings can be significant when dealing with multiple objects to be segmented. The technique can lead to weak-edge of missing-edge induced leakage, or a "leaky" segmentation, as some objects are not seen as closed ones. FIG. 1a shows an example of an image having two concentric features represented by their respective edges (edge-detected image), i.e. a star-shaped outer feature 10, with a closed edge, and a circular one 20, completely contained inside the star-shaped feature 10. For lack of contrast, a small edge portion 22 of the circular feature 20 is not detectable. The aforementioned watershed technique applied to the image of FIG. 1a would lead to the result of FIG. 1.b, in which only the outer feature 10 has been determined. Indeed, the circular feature 20 is missing as the watershed constructed for the outer feature 10 would "leak" into the circular feature 20 through the small edge portion 22.

It is an object of the present invention to provide a robust segmentation technique that avoids the aforementioned shortcomings of the watershed transform. It is a further object of the present invention to provide a segmentation technique with high accuracy for boundary determination and capable of dealing with multiple boundaries having different contrasts.

Accordingly, the present invention provides a segmentation apparatus according to claim 1 and a medical imaging system incorporating such apparatus. The invention further provides a method according to claim 14 and a computer program product according to claim 15.

The segmentation problem is converted into an equivalent steady-sate electrostatic flow problem with the fixed potential of markers serving as boundary conditions. The invention takes advantage of a so-called conformal map, i.e. a solution of a generalized image-data adaptive Laplace Partial Differential Equation (PDE). It avoids edge-induced leakage when edge portions are missing, and leads to a smooth interpolated shape to close out edges when the edge contrast is locally weak or absent. Therefore a high accuracy for boundary determination may be achieved and a segmentation technique of one or more embodiments of the invention may deal with multiple boundaries having different contrasts.

Figure 1B:
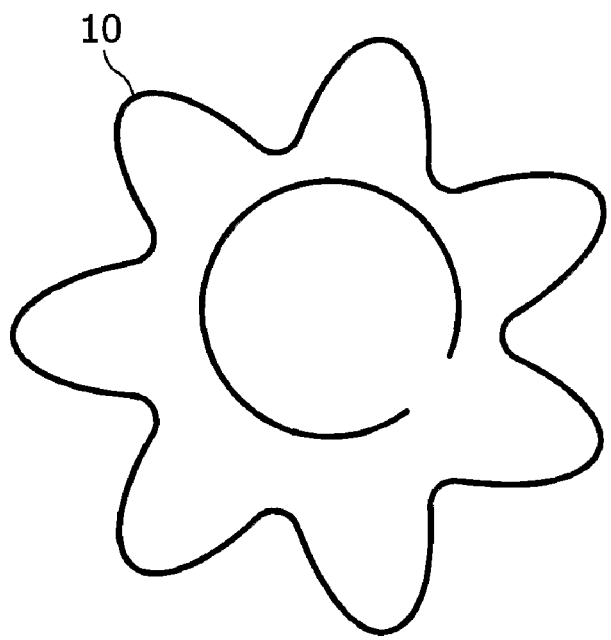
Figure 3:
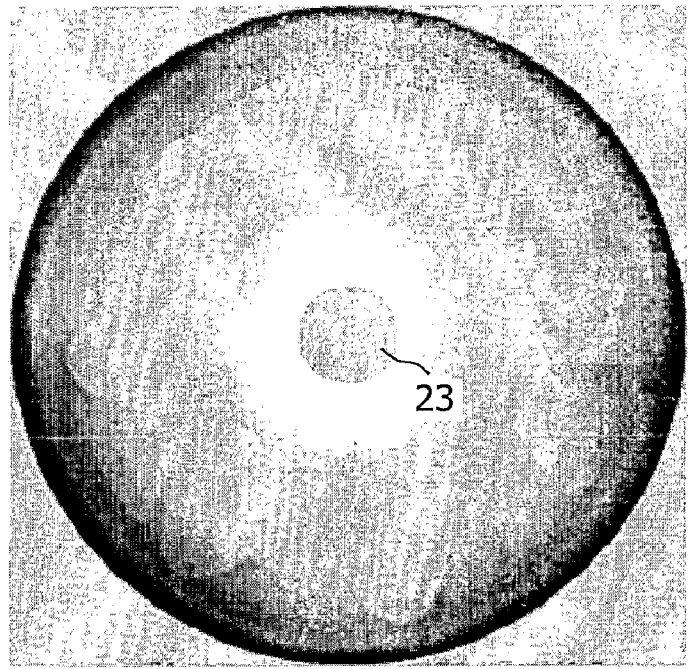
Figure 4:
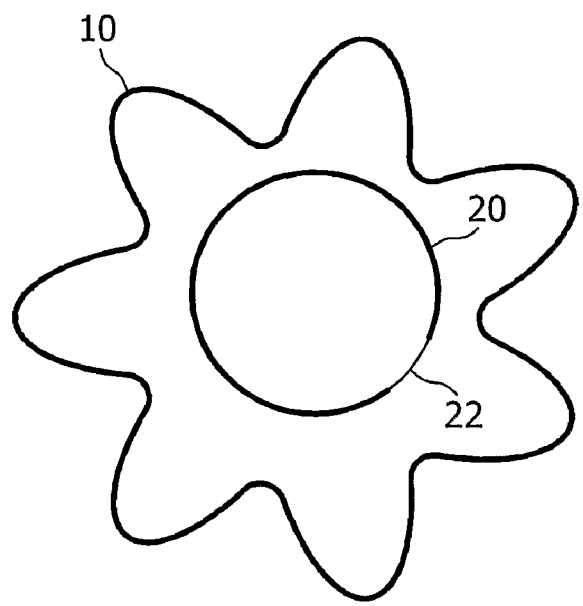
Figure 5:
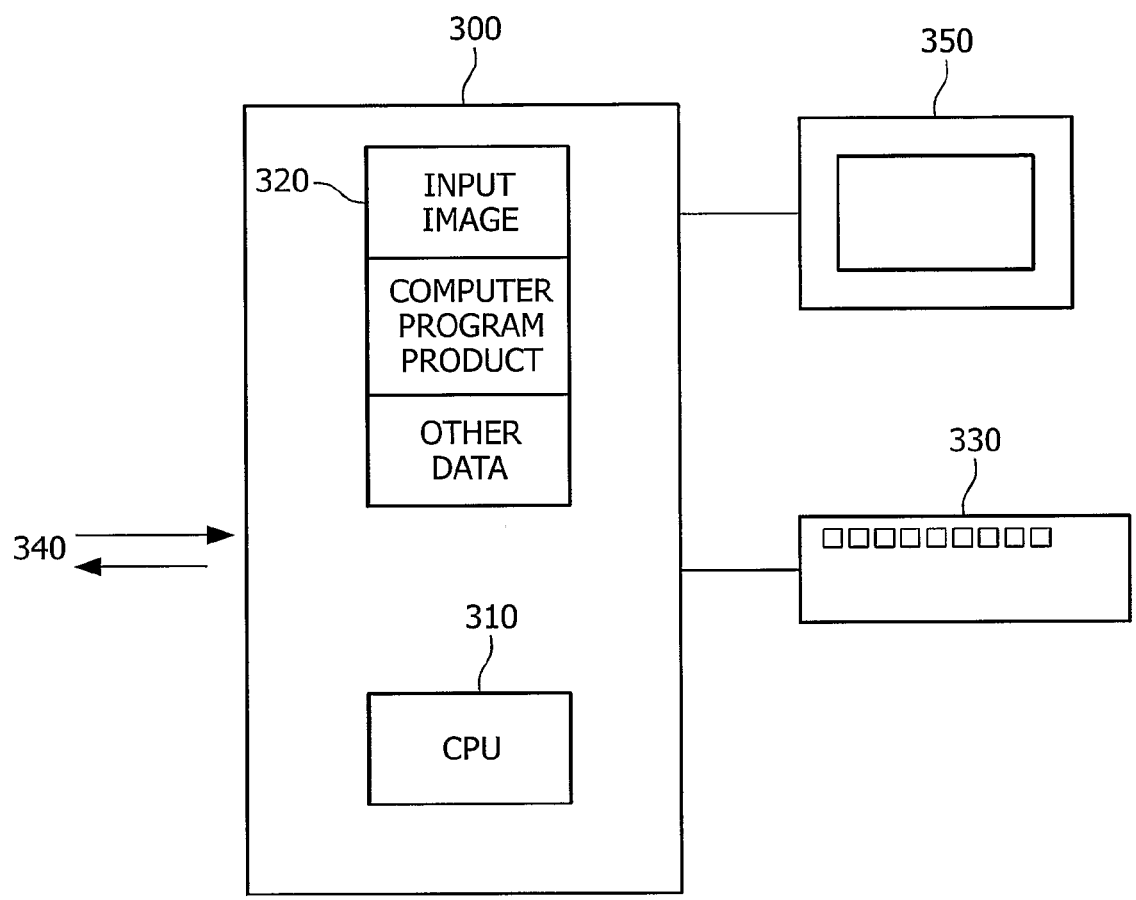

Other features and advantages of this invention will further appear in the hereafter description when considered in connection to the accompanying drawings, wherein:

FIG. 1a is a schematic representation of two concentric features in an image,

FIG. 1b is a schematic representation of resulting segmentation of the features from FIG. 1a using a know watershed transform, FIG. 2 is a flow chart of a segmentation method according to the present invention, FIG. 3 is a schematic representation of a potential map generated from the features of FIG. 1a using a segmentation method according to the present invention, FIG. 4 is a schematic representation of resulting segmentation of the features from FIG. 1b using the segmentation method according to the present invention, FIG. 5 is a schematic illustration of a general-purpose computer programmed according to the teachings of the present invention.

The present invention deals with the segmentation of objects in an image. Although the present invention is illustrated in a software implementation, it may also be implemented as a hardware component in, for example, a graphics card in a computer system.

Referring now to the drawings, and more particularly to FIG. 2, a flow chart of an exemplary segmentation method according to the invention is shown. The overall scheme includes an initial acquisition of a digital medical 2D or 3D image containing the object to be segmented in step 100. That step may include the use of a file converter component to convert images from one file format to another is necessary. The resulting input image is called M hereafter, p being a pixel index within the image. In the following, an image and its data will be referred to by the same name, hence M both refers to the input image and the input data for pixel p. The hereafter method can also be easily generalized to images of larger dimensions than 3D.

In a second step 110, the input image M is processed to provide an edge-detected image ED(p). The edge-detected image ED(p) is created using techniques known in the art, such as the local variance method or the gradient intensity method. The initial input data M is subjected to edge detection so that its edges are detected to determine edge intensity data ED(p) for distinguishing the edge region of an object from other regions. Alternatively, the input image M may be first subjected to sharpness and feature enhancement by a suitable technique to produce an image with enhanced sharpness.

The pixel values ED(p) in the edge-detected image account for the features in the ROI. They denote a feature saliency quantity which can be either the pixel intensity values, or any suitable data related to the feature intensity in the image M. The local gradient in pixel intensity is the most typical quantity to be used in the edge-detected image.

The edge-detected image ED(p) comprises a certain number of distinct objects. In the hereafter description, unless mentioned otherwise, two objects will be accounted for as an illustration. A generalization to a large number can be easily performed by a person skilled in the related field.

The edge-detected image ED(p) may be modified so as to set the edge intensity data to zero outside the region of interest (ROI), i.e. where the organ contour is not likely to be.

In order to segment objects by means of solving an electrostatic problem, a potential function $\Phi$ is defined for each pixel p of the edge-detected image ED(p) or ROI. The segmentation method according to the present invention uses the transposition of the segmentation problem into an electrostatic problem, the solution of which is the potential function $\Phi(p)$.

In step 120, markers are selected in the edge-detected image ED(p). Fixed potential values are defined and attached to the different markers. These potential values are used as fixed boundary conditions for the electrostatic problem.

An inner marker Min and an outer marker Mout are needed for each identified object in the edge-detected image ED(p). These inner and outer markers can be seen as an inner and an outer boundary linked to each object. For each object, the inner boundary may be limited to just one point anywhere inside this object, while the outer boundary may be the outer rim of the image, or the space in between this object and a neighboring one. The inner and outer markers may be entered into the computer system by the user (e.g. with a mouse or a similar pointing device) or set automatically. Prior knowledge on the shapes to extract can be introduced in the method according to the invention to make the algorithm even more robust by giving the inner and outer markers general shapes of the expected object outlines.

For each object, the inside marker Min is treated as an electrode having a potential Vin and, likewise, the outside marker Mout is treated as an electrode having a different potential Vout. The values of the potentials Vin and Vout are arbitrary and can be −100 V and +100 V for example.

In step 130, a resistivity map is generated using ED(p), i.e. a resistivity distribution (or equivalently a conductivity distribution) is mapped onto the edge-detected image ED(p): each pixel p receives a resistivity value ρ(p) based on its value in the edge-detected image. Typically, the resistivity value can be equal to the pixel intensity value in the edge-detected image, with higher values on the presumed object edges than in the intervening medium. The resistivity ρ(p) of the electrical medium, is generally taken to be an increasing function of the edge intensity values ED(p) which never takes values smaller than a positive minimum value.

In a preferred embodiment, the electrical conductivity γ(p) =1/ρ(p) of the resistive medium (per unit square in 2D or per unit cube in 3D) is taken as $$\gamma(p) = \frac{\text{constant}}{A^2 + ED(p)^2},$$

where A is a parameter selected to be of the order of the expected noise level in the edge-detected image ED(p). In other words, the resistivity ρ(p) at pixel p is proportional to $A^2 + ED(p)^2$.

In step 140, the 2D electrostatic problem is solved. Given the 2D resistivity distribution and the potential values Vin, Vout at the marker locations, known numerical analysis methods can be used to solve the steady-state electrostatic flow equation, yielding the distribution of the electrical potential.

In the watershed transform technique, a "fluid problem" is solved by flooding the gradient image seen as a topographic surface. Partial Differential Equations (PDE) to be solved are time-dependent as the flooding progresses over the topographic surface. Here, the idea of the method according to the invention lies in solving a steady state electrostatic flow problem defined over a resistive medium whose resistivity is linked to the edge-detected image data. This medium comprises the previously defined markers as electrodes to the set boundary conditions. Step 140 generates the potential function $\Phi$, or conformal potential map, as the solution to the above mentioned electrostatic flow problem, for each pixel p of the edge-detected image ED(p).

Let J be the electric current density vector within the resistive medium. J(p), $\Phi(p)$ and γ(p)=1/ρ(p) are functions of pixel p which refers to a position in the initial image M or the edge-detected image ED(p), as mentioned before. With $\nabla$ denoting the gradient vector operator, these three quantities are linked by the relationship:

$$J(p) = \gamma(p) . \nabla \Phi(p) \tag{1}$$

Since no source or sinks are assumed in the Region Of Interest (ROI), the vector J(p) satisfies the zero divergence condition:

$$\nabla . J(p) = 0 \tag{2}$$

where $\nabla$. stands for the divergence operator. One has to solve the Partial Differential Equation (PDE) obtained by substituting the expression of J(p) from equation (1) into equation 2.

$$\nabla . (\gamma(p) . \nabla \Phi(p)) = 0 \tag{3}$$

This is a PDE including one unknown which is the potential function $\Phi(p)$ within the ROI subject to boundary conditions defined on the internal and external markers.

No current sources or sinks are included in the ROI. Seeking the potential distribution over the resistive medium leads to the desired conformal potential map. This potential map produces fast changes at object boundaries and varies slowly between the edges. When part of an edge is missing, the method according to the invention allows for a smooth interpolation of the potential in the neighborhood of the missing edge portion.

Multi-grid algorithms to solve the electrical problem can be used. For example a finite difference method can be implemented. Other state of the art techniques can also be used.

In some instances, the method according to the invention can lead to potential map solutions displaying fast potential changes at points around the chosen inner markers, which could alter the sought after segmentation. A method must be devised so that fast potential changes occur at edge points with the ROI and not at the inner markers. A small inner marker is equivalent to a small inner electrode and may aggravate such unwanted fast potential changes near those markers.

In a preferred embodiment of the method to avoid unwanted fast potential changes (yielding unwanted artifacts) near the markers according to the invention, an iterative algorithm is implemented in order to obtain a more accurate potential map. From a practical point of view, following the fifth step 140, i.e. after the potential map generation, the conductivity $\gamma(p)$ is updated, in an additional step 145, using the generated potential map $\Phi(p)$. In a preferred embodiment of the invention, the modified value $\gamma^m(p)$ for updated conductivity is:

$$\gamma^m(p) = B \cdot \gamma(p)^2 \cdot |\nabla \Phi(p)| \qquad (4)$$

where $\gamma(p)$ is the conductivity used in the previous step to generate the potential map $\Phi(p)$, and B is an arbitrary constant.

This corresponds to a re-normalization of the conductivity $\gamma(p)$, and is performed over the ROI. It allows a local relaxation operation to avoid the potential attraction of some markers.

The same markers step 12 are kept, and after defining the electrostatic problem in a resistive medium having the updated conductivity $\gamma^m(p)$, a modified potential map is generated as a solution to the new electrostatic problem.

The updated resistivity at a pixel p is proportional to $\rho(p)^2/|\nabla\Phi(p)|$, where $\rho(p)$ is the resistivity of said resistive medium used to first generate the potential map $\Phi(p)$, and $\nabla$ stands for the gradient vector operator.

Several iterations may be needed in order to converge to a stable potential map, using an updated conductivity according to (4).

This potential map solution shows no minima or maxima except at the inside or outside boundary electrodes. FIG. 3 shows the resulting converged potential map which may be generated from the features of FIG. 1*a*, the different gray levels representing potential values. The shapes of both objects from the initial edge-detected image in FIG. 1*a* are present in the potential map. The missing edge portion 22 corresponds to a region of smooth potential variation. The central dark circle 23 corresponds to the region where the relaxation operation was carried out.

In an alternative embodiment represented by step 146 (select non linear option) in FIG. 2, the linear electrostatic PDE of equation (2) can be replaced by a nonlinear PDE in which the conductivity $\gamma(p)$ is itself a function of the potential map $\Phi(p)$. This option can either be selected right after the step 130, i.e. the resistivity map generation, or after the potential map generation of step 140, i.e. during the iterative algorithm.

In a preferred embodiment, $\gamma(p)$ is replaced by a non linear function $\gamma^{nl}(p)$:

$$\gamma^{nl}(p) = \frac{\gamma(p)}{(1+|\nabla\Phi(p)|^2)^{1/2}} \qquad (5)$$

which, when plugged into equation (2) yields to:

$$\nabla \cdot \left( \frac{\gamma(p)}{(1+|\nabla\Phi(p)|^2)^{1/2}} \cdot \nabla \Phi(p) \right) = 0 \qquad (6)$$

This is a non linear PDE including one unknown which is the potential function $\Phi(p)$ within the ROI subject to boundary conditions defined on the internal and external markers.

This step is then followed by the fifth step 140 in the segmentation method, in which the potential map is generated as the solution to a non linear electrostatic problem of (6).

This step is optional. It can be implemented right after the resistivity map generation, in place of the linear PDE (2), and instead of the conductivity update of step 145 described here before, to also avoid the electrode fast potential change artifact.

It can be also associated to the conductivity update of step 145, i.e. after solving a first linear PDE (2) to get the potential map $\Phi(p)$, the conductivity is updated to $\gamma^m(p)$ according to (4), and the new electrostatic problem to solve is then the non linear PDE (6). The same iterative algorithm described here before is then implemented with the use of the non linear PDE (6) instead of the use of the linear PDE (2).

In step 150, the segmented contours of the input image M are generated thanks to the conformal potential map $\Phi(p)$ calculated in the previous step.

The conformal $\Phi(p)$ potential map can be subjected to a dynamic thresholding technique (i.e. through the definition of a position-dependent threshold). One solution for this thresholding operation consists in setting a neighborhood for every internal pixel p in each object and determining, within this neighborhood, which potential value $\Phi(p)$ corresponds to the highest sum of edge intensity data from ED(p) (this may be done by a suitable histogram technique). The map thus thresholded provides the desired object segmentation when just one boundary edge is to be detected.

When multiple organ boundaries have to be detected, this algorithm requires a dynamic thresholding step to be performed within increasing intervals of the potential $\Phi$.

Other thresholding methods, like the one used for the watershed transform presented in the previously mentioned article by F. Meyer, and P. Maragos, can also be used.

Alternatively, the different organ boundaries can be sequentially defined. For example, a first application of the segmentation method with one inner marker, allows the definition of the innermost contour. Then this innermost contour can be used as a new inner marker for second application of the segmentation method and so forth.

FIG. 4 presents the segmented contours after a thresholding operation has been applied to the potential map shown in FIG. 3. Both objects, the star-shaped object 10 and the circular one 20, from FIG. 1*a* are identified. The circular one is now a closed object as the missing edge portion 22 of FIG. 1*a* has been completed.

Regarding the display of the segmented image, techniques known in the art can be used to view the results. For example, displaying all pixels classified as inside the object to a certain gray level, while setting all pixels classified as outside said object to another gray level very different from the previous one so that the contour becomes apparent.

The overall computation complexity of the method according to the invention is low. A very efficient solver of the electrostatic problem has been proposed, using a hierarchy of discrete circuit approximations going from coarse to fine. A limited number of iterations is needed for convergence (equivalent to about 10 passages on each internal point for performing a local relaxation operation).

This invention also provides an apparatus for segmenting objects in an image, comprising acquisition means to receive an input image M containing at least one object, this image comprising pixel data sets of at least two dimensions. The apparatus according to the invention further comprises processing means to implement the method according to the present invention, to provide an edge-detected image from the input image, and generate a conformal potential map as the solution to an electrostatic problem into which the segmentation problem is converted. The apparatus further comprises selecting means to select at least one marker in the edge-detected image, and associate the marker to a fixed electrostatic potential value.

This invention may be conveniently implemented using a conventional general-purpose digital computer or micro-processor programmed according to the teachings of the present application. The apparatus is advantageously part of a medical imaging system.

FIG. 5 is a block diagram of a computer system 300, in accordance to the present invention. Computer system 300 can comprise a CPU (central processing unit) 310, a memory 320, an input device 330, input/output transmission channels 340, and a display device 350. Other devices, as additional disk drives, additional memories, network connections . . . may be included but are not represented.

Memory 320 includes a source file containing the input image M, with objects to be segmented. Memory 320 can further include a computer program product, meant to be executed by the CPU 310. This program comprises instructions to perform the method described here-above. The input device is used to receive instructions from the user for example to select the ROI and/or the marker location within the image, and/or run or not different stages or embodiments of the method. Input/output channels can be used to receive the input image M to be stored in the memory 320, as well as sending the segmented image (output image) to other apparatuses. The display device can be used to visualize the output image comprising the resulting segmented objects from the input image.

The invention claimed is:

1. An apparatus for segmenting objects in an image, comprising:
    input means for receiving an input image containing at least one object, said input image comprising pixel data sets of at least two dimensions;
    means for generating an edge-detected image from said input image;
    means for selecting markers in said edge-detected image, and for assigning respective fixed electrical potential values to said markers;
    computation means for generating an electrical potential map as a solution to an electrostatic flow problem in a resistive medium having a resistivity dependent on the edge-detected image, with the markers defining electrodes at the respective fixed potential values; and
    means for estimating object contours from said potential map.

2. The apparatus as claimed in claim 1, further comprising means for updating the resistivity of said resistive medium using the generated potential map, wherein the computation means are arranged to generate a further electrical potential map as a solution to a new electrostatic problem in a resistive medium having the updated resistivity.

3. The apparatus as claimed in claim 2, wherein the updated resistivity at a pixel p is proportional to $$\frac{\rho(p)^2}{|\nabla \Phi(p)|},$$

where $\rho(p)$ is the resistivity of said resistive medium used to first generate the potential map $\Phi(p)$, and $\nabla$ stands for the gradient vector operator.

4. The apparatus as claimed in claim 3, wherein the new electrostatic problem is of the form:

$$\nabla \cdot (\gamma(p) \cdot \nabla \Phi(p)) = 0 \text{ or}$$

$$\nabla \cdot \left( \frac{\gamma(p)}{(1 + |\nabla \Phi(p)|^2)^{1/2}} \cdot \nabla \Phi(p) \right) = 0$$

where $\Phi(p)$ is said potential map, defined on a pixel p of said edge-detected image, $\gamma(p)$ is the updated electrical conductivity of the medium, i.e. the inverse of the updated resistivity, $\nabla$ stands for the gradient vector operator and $\nabla\cdot$ stands for the divergence operator.

5. The apparatus as claimed in claim 4, wherein said resistivity at a pixel p is proportional to $A^2 + ED(p)^2$, where $ED(p)$ designates a value of the edge-detected data for said pixel p, and A is a constant of the order of an expected noise level in the edge-detected image.

6. The apparatus as claimed in claim 1, wherein said edge-detected image is defined in a region of interest of said input image, encompassing said object.

7. The apparatus as claimed in claim 1, wherein the means for selecting markers are arranged to select at least one inner marker inside said object and at least one outer marker outside said object, said inner marker being assigned a first fixed potential value, and said outer marker being assigned a second fixed potential value.

8. The apparatus as claimed in claim 1, wherein said resistivity at a pixel p is proportional to $A^2 + ED(p)^2$, where $ED(p)$ designates a value of the edge-detected data for said pixel p, and A is a constant of the order of an expected noise level in the edge-detected image.

9. The apparatus as claimed in claim 1, wherein said electrostatic flow problem is of the form:

$$\nabla \cdot (\gamma(p) \cdot \nabla \Phi(p)) = 0$$

where $\Phi(p)$ is said potential map, defined on a pixel p of said edge-detected image, $\gamma(p)$ is the electrical conductivity of the medium, i.e. the inverse of the resistivity, $\nabla$ stands for the gradient vector operator and $\nabla\cdot$ stands for the divergence operator.

10. The apparatus as claimed in claim 9, wherein said resistivity at a pixel p is proportional to $A^2 + ED(p)^2$, where $ED(p)$ designates a value of the edge-detected data for said pixel p, and A is a constant of the order of an expected noise level in the edge-detected image.

11. The apparatus as claimed in claim 1, wherein said electrostatic problem is of the form:

$$\nabla \cdot \left( \frac{\gamma(p)}{(1+|\nabla \Phi(p)|^2)^{1/2}} \cdot \nabla \Phi(p) \right) = 0$$

where Φ(p) is said potential map, defined on a pixel p of said edge-detected image, γ(p) is the electrical conductivity of the medium, i.e. the inverse of the resistivity, ∇ stands for the gradient vector operator and ∇. stands for the divergence operator.

12. The apparatus as claimed in claim 11, wherein said resistivity at a pixel p is proportional to $A^2+ED(p)^2$, where ED(p) designates a value of the edge-detected data for said pixel p, and A is a constant of the order of an expected noise level in the edge-detected image.

13. A medical imaging system, comprising means for acquiring an input image depicting body organs, and an apparatus as claimed in claim 1 for segmenting objects in said input image.

14. A method of segmenting objects in an image, comprising the steps of:

receiving an input image containing at least one object, said input image comprising pixel data sets of at least two dimensions;

generating an edge-detected image from said input image;

selecting markers in said edge-detected image, and assigning respective fixed electrical potential values to said markers;

generating an electrical potential map as a solution to an electrostatic flow problem in a resistive medium having a resistivity dependent on the edge-detected image, with the markers defining electrodes at the respective fixed potential values; and estimating object contours from said potential map.

15. A computer program product embodied on a computer-readable medium, for execution in a processing unit of an image processing apparatus, the computer program product comprising instructions to perform a segmentation method according to claim 14 when the program product is run in the processing unit.

\* \* \* \* \*